US009281994B2

(12) United States Patent
Love et al.

(10) Patent No.: US 9,281,994 B2
(45) Date of Patent: Mar. 8, 2016

(54) PROCESSING ALGEBRAIC EXPRESSIONS FOR KEYED DATA SETS

(75) Inventors: Matthew D. Love, Perth (AU); Daniel P. Van Vugt, Innaloo (AU)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 11/965,860

(22) Filed: Dec. 28, 2007

(65) Prior Publication Data
US 2009/0171887 A1    Jul. 2, 2009

(51) Int. Cl.
*G06F 7/00*       (2006.01)
*G06F 17/30*      (2006.01)
*H04L 12/24*      (2006.01)

(52) U.S. Cl.
CPC .......... *H04L 41/024* (2013.01); *H04L 41/0213* (2013.01)

(58) Field of Classification Search
CPC ... H04L 41/024; H04L 41/0213; G06F 17/30; G06F 17/5009; G06F 17/2205; G06F 17/30932; G06F 17/2247; G06F 17/2229; G06F 17/30917
See application file for complete search history.

(56) References Cited

U.S. PATENT DOCUMENTS

| | | | | |
|---|---|---|---|---|
| 6,176,883 | B1 * | 1/2001 | Holloway et al. | 709/223 |
| 7,415,473 | B2 * | 8/2008 | Zimmerer | |
| 2002/0197594 | A1 * | 12/2002 | Dickmeyer et al. | 434/322 |
| 2008/0270371 | A1 * | 10/2008 | Fiebig | 707/4 |

* cited by examiner

*Primary Examiner* — Azam Cheema
(74) *Attorney, Agent, or Firm* — Steven M. Greenberg, Esq.; CRGO Law

(57) ABSTRACT

Embodiments of the present invention address deficiencies of the art in respect to managed object expression and provide a method, system and computer program product for algebraically expressing a managed object in a keyed data set. In an embodiment of the invention, a method for algebraically expressing a managed object in a keyed data set can be provided. The method can include specifying one-dimensional sets of managed objects each with a corresponding single partial object identifier with wildcard and incorporating each single partial object identifier with wildcard into an algebraic expression compositing managed objects in the keyed data set. The method further can include evaluating the algebraic expression to generate an index for the composited managed objects in the keyed data set, and managing the composited index in a computer communications network by reference to the index.

8 Claims, 2 Drawing Sheets

US 9,281,994 B2

PROCESSING ALGEBRAIC EXPRESSIONS FOR KEYED DATA SETS

BACKGROUND OF THE INVENTION

1. Field of the Invention

The present invention relates to the field of managed objects, and more particularly to the field of distributed management expression processing of managed objects in a keyed data set.

2. Description of the Related Art

The Simple Network Management Protocol (SNMP) framework has been designed to facilitate the exchange of management information in a computer communications network. The Management Information Base (MIB) set forth as part of the SNMP framework defines the management information for a device in the computer communications network. In this regard, the MIB contains a collection of MIB objects otherwise referred to as managed objects that describe the characteristics of a device using SNMP. In particular, managed objects have been defined according to the rules set out in the Structure of Management Information (SMI) standard well-known in the art.

According to SMI, each managed object has two names— an object descriptor and an object identifier. The object descriptor is a conventional text name that provides a user recognizable reference to the object. The object identifier, in turn, provides a sequence of integers specifying a location of the managed object in a global object hierarchy maintained by the well-known international standards bodies ISO and ITS. Thus, the object identifier acts as a key to the managed object and can be manipulated in a programmatic fashion, while the object descriptor provides a human readable way to recognize the managed object.

It often can be important to work with values not present within an MIB. Consequently, one is left with the prospect of populating an already overflowing MIB with additional managed objects, or expressing the needed managed object as a function of existing managed objects. The Expression MIB set forth in Request for Comment (RFC) 2982 provides just such a facility. Specifically, RFC 2982 provides for externally defined expressions of existing MIB objects. In the Expression MIB, the results of an evaluated expression are MIB objects themselves that may be used like any other managed object in the MIB. These dynamically defined objects are thus usable anywhere any other MIB object can be used and can even be used by the Expression MIB itself, forming expressions of expressions.

The Expression MIB solution set forth in RFC 2982 can be complicated to implement, principally because the Expression MIB solution of RFC 2982 requires the user to provide numerous tables of input in a fixed format. Yet, the purpose of the Expression MIB is to simplify the specification and use of a managed object in the MIB without undertaking the complexity of adding the required managed object to the MIB. Thus, what is needed is a simplified way to express a required managed object from a potentially large data set amongst data in a keyed data set such as an MIB.

BRIEF SUMMARY OF THE INVENTION

Embodiments of the present invention address deficiencies of the art in respect to managed object expression and provide a novel and non-obvious method, system and computer program product for algebraically expressing a managed object in a keyed data set. In an embodiment of the invention, a method for algebraically expressing a managed object in a keyed data set can be provided. The method can include specifying one-dimensional sets of managed objects each with a corresponding single partial object identifier with wildcard and incorporating each single partial object identifier with wildcard into an algebraic expression compositing managed objects in the keyed data set. The method further can include evaluating the algebraic expression to generate an index for the composited managed objects in the keyed data set, and managing the composited index in a computer communications network by reference to the index.

In one aspect of the embodiment, evaluating the algebraic expression to generate an index for the composited managed objects in the keyed data set can include evaluating the algebraic expression to generate an index for the composited managed objects in the keyed data set according to a set of indexing rules promoting scalar values first, resultant one-dimensional sets of object identifiers for managed objects second and multi-dimensional sets of object identifiers third. In an alternative aspect of the embodiment, evaluating the algebraic expression to generate an index for the composited managed objects in the keyed data set can include evaluating the algebraic expression to generate an index for the composited managed objects in the keyed data set according to a set of indexing rules promoting scalar values first, and resultant one-dimensional sets of object identifiers for managed objects second while producing an undefined outcome for multi-dimensional sets of object identifiers third.

In another embodiment of the invention, a managed object data processing system can be provided. The system can include a host computing platform coupled to a keyed data set of managed objects such as an MIB, indexing rules for indexing a composition of the managed objects produced by evaluating an algebraic expression on the keyed data set, and algebraic expression processing logic executing in the host computing platform. The logic can include program code enabled to specify one-dimensional sets of managed objects each with a corresponding single partial object identifier with wildcard, to incorporate each single partial object identifier with wildcard into an algebraic expression compositing managed objects in the keyed data set, and to evaluate the algebraic expression to generate an index for the composited managed objects in the keyed data set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for algebraically expressing a managed object in a keyed data set. In accordance with an embodiment of the present invention, an expression can be formulated to specify multiple different managed objects in a keyed data set with a single object identifier incorporating a wildcard. The expression can be evaluated and indexed according to a set of indexing rules addressing multiple different sub-expressions with corresponding wildcards. In this regard, the indexing rules can be provided for a return set of results corresponding to the different sub-expressions so that the individual results maintain relevancy for different portions of the expression as a whole.

Figure 1:
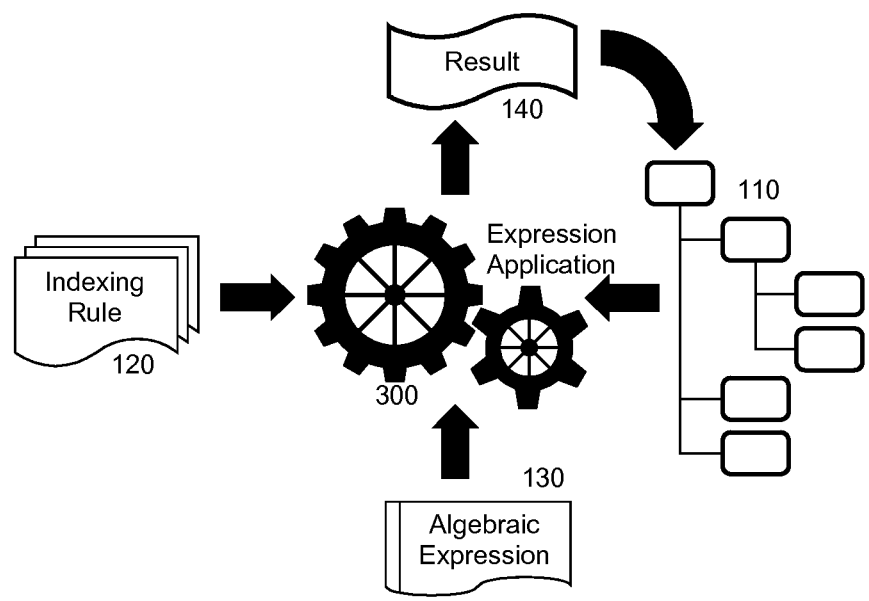
FIG. 1 is a pictorial illustration of a process for algebraically expressing a managed object in a keyed data set.

In further illustration, FIG. 1 pictorially depicts a process for algebraically expressing a managed object in a keyed data set. As shown in FIG. 1, algebraic expression processing logic 300 can process an algebraic expression 130 as a function of multiple different managed objects in a keyed data set 110 such as an MIB according to wild card references in object identifiers for the managed objects. In particular, the algebraic expression processing logic 300 can parse the algebraic expression 130 into its constituent sub-expressions. Thereafter, the logic 300 can select ones of the sub-expressions that reference managed objects in the keyed data set 110 by wildcard. The selected ones of the sub-expressions can be evaluated against the data in the keyed data 110 to produce a result 140 and a set of indexing rules 120 can manage the composition of the result 140 to be used as a de facto managed object in the keyed data set 110 without requiring the insertion of the result 140 into the keyed data set 110 as an additional managed object.

Figure 2:
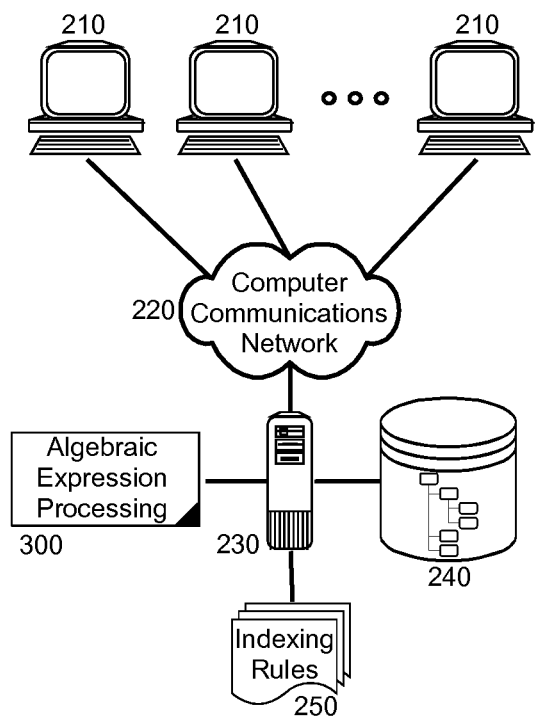
FIG. 2 is a schematic illustration of a computer communications data processing system configured to algebraically express a managed object in a keyed data set; and, FIG. 3 is a flow chart illustrating a process for algebraically expressing a managed object in a keyed data set.

In further illustration, FIG. 2 is a schematic illustration of a computer communications data processing system configured to algebraically express a managed object in a keyed data set. The system can include a host computing platform 230 communicatively coupled to multiple different clients 210 over computer communications network 220. The host computing platform 230 can be coupled to a keyed data set 240, such as an MIB. In this regard, the keyed data set 240 can include multiple different entries for managed objects, each providing an object identifier and corresponding object data. Further, the managed objects in the keyed data set 240 can be arranged hierarchically to facilitate the organization (grouping) of the managed objects.

Notably, algebraic expression processing logic 300 can be coupled to the host computing platform 230. The algebraic expression processing logic 300 can include program code enabled to receive an algebraic expression specifying one or more sets of managed objects in the keyed data set 240 by reference to a common object identifier for the managed objects in the keyed data set 240 combined with a wildcard entry in which distinguishing portions of the object identifiers for respective ones of the managed objects in the keyed data set 240 can be specified. For example, object identifier with wildcard .1.3.6.1.2.1.2.2.1.4.9? can select each of .1.3.6.1.2.1.2.2.1.4.12, .1.3.6.1.2.1.2.2.1.4.23, and .1.3.6.1.2.1.2.2.1.4.34 in the keyed data set. In this way, the expression "25*.1.3.6.1.2.1.2.2.1.4.?" with the single expression input of .1.3.6.1.2.1.2.2.1.4.? can produce the one-dimensional set of data resultant from 25* the value of the object data addressed by .1.3.6.1.2.1.2.2.1.4.12, from 25* the value of the object data addressed by .1.3.6.1.2.1.2.2.1.4.23, and from 25* the value of the object data addressed by .1.3.6.1.2.1.2.2.1.4.34. The one-dimensional set of data in turn can be utilized as the managed object composited from the expression in lieu of adding a like managed object to the keyed data set 240.

It is to be recognized by the skilled artisan that in a binary sub-expression such as X+Y, it is possible that two different wild-carded object identifiers can be provided such that a two-dimensional set of data can result. In this circumstance, a set of indexing rules can be provided to facilitate the evaluation of a parent expression for the sub-expression. The indexing rules 250 can include in order of priority:

1. Functions which operate on one-dimensional sets of managed objects return a scalar result such as "sum (.1.4.5.6.9.8.7.?)" which scalar result can be propagated to a parent node in the expression.
2. Instance indexes for a one-dimensional set of managed objects resulting from the evaluation of a sub-expression are propagated to a parent node in the expression.
3. Where the evaluation of two separate sub-expressions in a binary sub-expression of the algebraic expression return respective non-scalar results in a two-dimensional set of results, the result propagated to the parent node is the set of all combinations of the two contributing indexing schemes. Alternatively, if multi-dimensional processing is not required, the result can be labeled un-defined.

Figure 3:
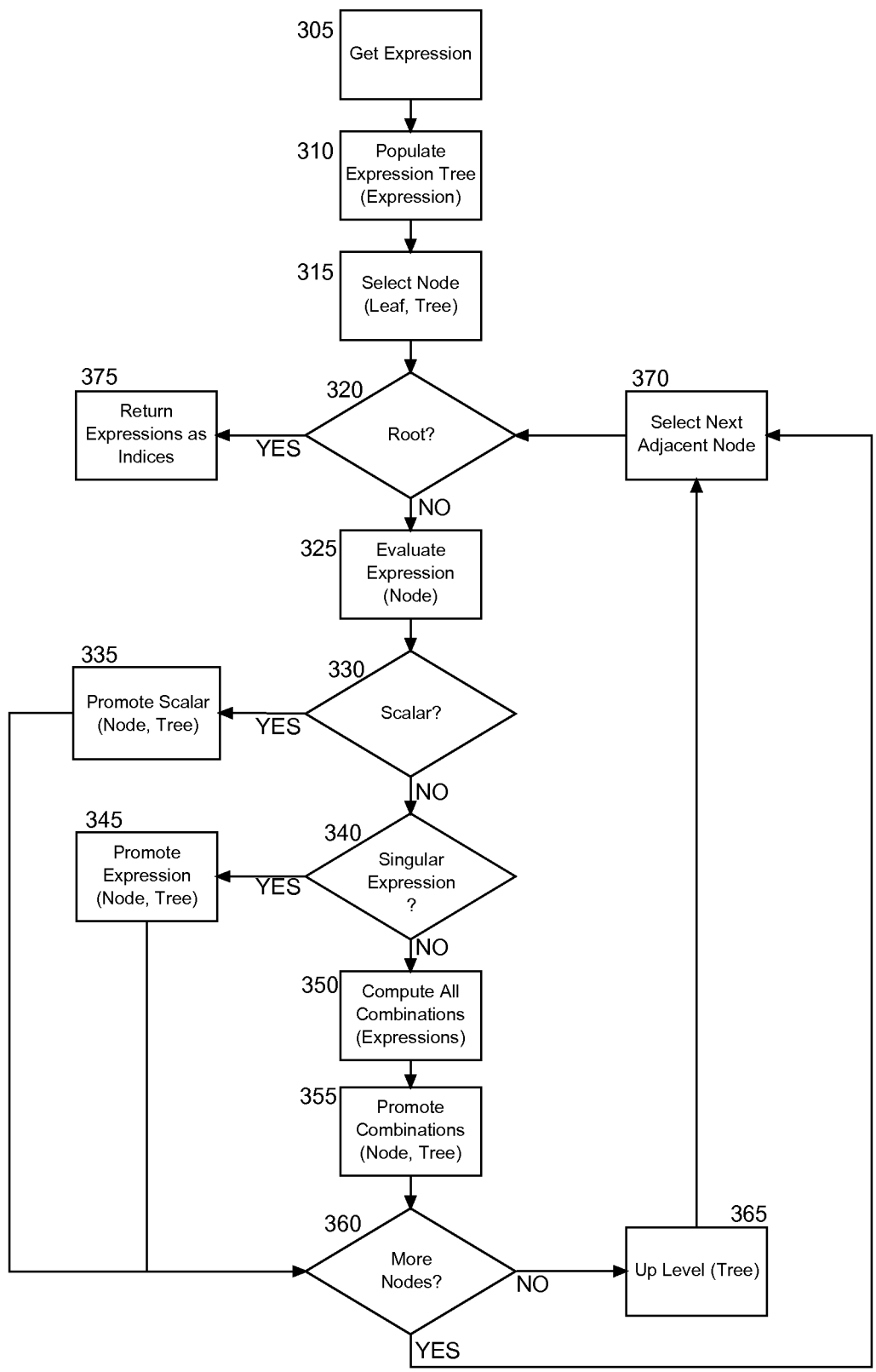

In further illustration of the operation of the algebraic expression processing logic 300, FIG. 3 is a flow chart illustrating a process for algebraically expressing a managed object in a keyed data set. The process can begin in block 305 with an algebraic expression such as 123+(456*.1.3.6.1.2.1.2.2.1.4.?)/sum(.1.4.5.6.9.8.7.?)

where 123 and 456 are scalar values, sumo is a mathematical function producing a scalar value and .1.3.6.1.2.1.2.2.1.4.? and .1.4.5.6.9.8.7.?

are partial object identifiers with wildcards resolving to a set of object identifiers corresponding to managed objects in a keyed data set.

In response to receiving the algebraic expression, in block 310 the algebraic expression can be parsed into an expression tree indicating an order of evaluation according to principles of algebraic ordering of operations. For instance, continuing with the example, an expression tree can be produced as follows:

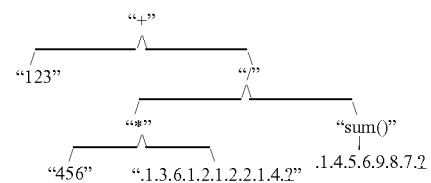

having a root node, two nodes at a second level of the tree, two nodes at a third level of the tree, and three leaf nodes at a fourth level of the tree.

In block 315, a sub-expression amongst leaf nodes can be selected in the tree and in decision block 320 it can be determined whether or not the selected sub-expression includes an operand at a root node for the tree. If not, in block 325 the sub-expression can be evaluated and in block 330 it can be determined whether or not the result is a scalar value. If so, in block 335 the scalar value can be passed to a parent node incorporating the operand at a next higher level in the tree. Otherwise, in decision block 340 it can be determined whether or not the result is a one-dimensional set of object identifiers for respective managed objects in the keyed data set. If so, the one-dimensional set can be passed to the parent node. Otherwise, the process can continue in block 350.

In block 350, given the multi-dimensional set resulting from the evaluation of the sub-expression, a result set can be composited of all possible combinations of the results sets produced by an evaluation of both partial object identifiers with wildcards. The multi-dimensional result set in turn can be passed to the parent node in block 355. In all cases, in decision block 360, if further sub-expressions remain to be evaluated at the current level in the tree, in block 370 a next sub-expression can be selected and the process can continue through decision block 320. However, when all sub-expressions have been evaluated at the current level, in block 365 a next level of the tree can be selected and a first sub-expression further selected in block 370. In decision block 320, it can be determined whether or not the selected sub-expression is not at a root level of the tree. If so, the final result of the sub-expression can be evaluated and produced as one or more indices into the keyed data set in block 375.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for algebraically expressing a managed object in a keyed data set, the method comprising:

specifying in algebraic processing logic executing in a host computing platform, a plurality of one-dimensional sets of managed objects each with a corresponding single partial object identifier with wildcard;

incorporating by the algebraic processing logic each single partial object identifier with wildcard into an algebraic expression compositing a plurality of managed objects in a keyed data set of a management information base (MIB) containing a collection of managed objects that describe the characteristics of a device using the simple network management protocol (SNMP);

parsing by the algebraic processing logic the algebraic expression into constituent algebraic sub-expressions and selecting ones of the sub-expressions for evaluation against the managed objects in the keyed data set of the MIB;

evaluating by the algebraic processing logic the selected ones of the algebraic sub-expressions to generate an index for the composited managed objects in the keyed data set of the MIB; and, managing the composited index in a computer communications network by reference to the index.

2. The method of claim 1, wherein evaluating the algebraic expression to generate an index for the composited managed objects in the keyed data set, comprises evaluating the algebraic expression to generate an index for the composited managed objects in the keyed data set according to a set of indexing rules promoting scalar values first, resultant one-dimensional sets of object identifiers for managed objects second and multi-dimensional sets of object identifiers third.

3. The method of claim 1, wherein evaluating the algebraic expression to generate an index for the composited managed objects in the keyed data set, comprises evaluating the algebraic expression to generate an index for the composited managed objects in the keyed data set according to a set of indexing rules promoting scalar values first, and resultant one-dimensional sets of object identifiers for managed objects second while producing an undefined outcome for multi-dimensional sets of object identifiers third.

4. A managed object data processing system comprising:

a management information base (MIB) comprising a keyed data set of managed objects that describe the characteristics of a device using the simple network management protocol (SNMP);

a host computing platform coupled to the keyed data set of managed objects in the MIB, the platform comprising at least one computer with memory and at least one processor;

a plurality of indexing rules for indexing a composition of the managed objects produced by evaluating an algebraic expression on the keyed data set; and, algebraic expression processing logic executing in the memory of the host computing platform, the logic comprising program code enabled to specify a plurality of one-dimensional sets of managed objects each with a corresponding single partial object identifier with wildcard, to incorporate each single partial object identifier with wildcard into an algebraic expression compositing a plurality of managed objects in the keyed data set, to parse the algebraic expression into constituent algebraic sub-expressions and selecting ones of the sub-expressions for evaluation against the managed objects in the keyed data set of the MIB, and to evaluate the selected ones of the algebraic sub-expressions to generate an index for the composited managed objects in the keyed data set of the MIB.

5. The system of claim 4, wherein the indexing rules comprise a set of rules for indexing a result produced by evaluating the algebraic expression by promoting scalar values first, resultant one-dimensional sets of object identifiers for managed objects second and multi-dimensional sets of object identifiers third.

6. A computer program product comprising a non-transitory computer usable medium embodying computer usable program code for algebraically expressing a managed object in a keyed data set, the computer program product comprising:
  computer usable program code for specifying a plurality of one-dimensional sets of managed objects each with a corresponding single partial object identifier with wildcard;
  computer usable program code for incorporating each single partial object identifier with wildcard into an algebraic expression compositing a plurality of managed objects in a keyed data set of a management information base (MIB) containing a collection of managed objects that describe the characteristics of a device using the simple network management protocol (SNMP);
  computer usable program code for parsing by the algebraic processing logic the algebraic expression into constituent algebraic sub-expressions and selecting ones of the sub-expressions for evaluation against the managed objects in the keyed data set of the MIB;
  computer usable program code for evaluating the selected ones of the algebraic expressions to generate an index for the composited managed objects in the keyed data set of the MIB; and,
  computer usable program code for managing the composited index in a computer communications network by reference to the index.

7. The computer program product of claim 6, wherein the computer usable program code for evaluating the algebraic expression to generate an index for the composited managed objects in the keyed data set, comprises computer usable program code for evaluating the algebraic expression to generate an index for the composited managed objects in the keyed data set according to a set of indexing rules promoting scalar values first, resultant one-dimensional sets of object identifiers for managed objects second and multi-dimensional sets of object identifiers third.

8. The computer program product of claim 6, wherein the computer usable program code for evaluating the algebraic expression to generate an index for the composited managed objects in the keyed data set, comprises computer usable program code for evaluating the algebraic expression to generate an index for the composited managed objects in the keyed data set according to a set of indexing rules promoting scalar values first, and resultant one-dimensional sets of object identifiers for managed objects second while producing an undefined outcome for multi-dimensional sets of object identifiers third.

* * * * *